United States Patent
Inagaki

[19]

[11] Patent Number: 5,941,334
[45] Date of Patent: Aug. 24, 1999

[54] YAW MOMENT CONTROL APPARATUS FOR VEHICLE

[75] Inventor: Hiromi Inagaki, Saitama, Japan

[73] Assignee: Honda Giken Kogyo Kabushiki Kaisha, Tokyo, Japan

[21] Appl. No.: 09/066,902

[22] Filed: Apr. 28, 1998

[30] Foreign Application Priority Data

Apr. 28, 1997 [JP] Japan .................................. 9-111215

[51] Int. Cl.⁶ ............................................... B60K 17/356
[52] U.S. Cl. ..................... 180/242; 180/243; 180/305; 180/308; 280/5.506; 280/5.51; 267/186
[58] Field of Search ..................................... 180/305, 306, 180/307, 308, 242, 243, 244, 233, 415, 404, 414, 422; 701/41, 37, 42, 48, 38, 45; 267/186, 188, 187; 280/5.51, 5.512, 5.511, 5.502, 5.508, 5.506

[56] References Cited

U.S. PATENT DOCUMENTS

| | | |
|---|---|---|
| 3,900,075 | 8/1975 | Chichester et al. . |
| 3,910,369 | 10/1975 | Chichester et al. . |
| 3,918,546 | 11/1975 | Chichester et al. ..................... 180/243 |
| 4,588,039 | 5/1986 | Uno et al. ............................... 180/415 |
| 4,613,153 | 9/1986 | Shibahata et al. . |
| 4,720,790 | 1/1988 | Miki et al. ................................. 701/41 |
| 4,761,022 | 8/1988 | Ohashi et al. . |
| 4,860,845 | 8/1989 | Janson . |
| 4,869,335 | 9/1989 | Takahashi . |
| 4,883,141 | 11/1989 | Walker ...................................... 180/243 |
| 4,914,592 | 4/1990 | Callahan et al. ........................... 701/41 |
| 4,941,097 | 7/1990 | Karnopp et al. . |
| 4,998,593 | 3/1991 | Karnopp et al. . |
| 5,005,858 | 4/1991 | Torrielli et al. . |
| 5,104,143 | 4/1992 | Yonekawa ................................. 701/38 |
| 5,141,069 | 8/1992 | Yasai ....................................... 180/422 |
| 5,150,764 | 9/1992 | Eguchi et al. ........................... 180/415 |
| 5,156,229 | 10/1992 | Yasui et al. . |
| 5,159,553 | 10/1992 | Karnopp et al. . |
| 5,177,681 | 1/1993 | Sato . |
| 5,212,641 | 5/1993 | Iwata et al. . |
| 5,662,356 | 9/1997 | Lund ....................................... 267/187 |

*Primary Examiner*—Douglas C. Butler
*Attorney, Agent, or Firm*—Armstrong, Westerman, Hattori, McLelland & Naughton

[57] ABSTRACT

A left hydraulic pump connected to a left wheel and a right hydraulic pump connected to a right wheel of a vehicle are connected by a first oil passage and a second oil passage to constitute a closed circuit, and first and second variable throttle valves are provided between the first and second oil passages and the tank. Either one of the first and second variable throttle valves is throttled to cause the first and second hydraulic pumps to produce a braking force and a driving force, respectively, thereby controlling a yaw moment. At the same time, when either one of left and right wheel suspensions expands, the roll rigidity of the vehicle increases or decreases to vary the cornering forces of the wheels, thereby producing a yaw moment which assists in the yaw moment produced by the first and second hydraulic pumps.

12 Claims, 8 Drawing Sheets

YAW MOMENT CONTROL APPARATUS FOR VEHICLE

BACKGROUND OF THE INVENTION

1. Field of the Invention

The present invention relates to a yaw moment control apparatus for a vehicle which controls a yaw moment by producing a driving force in one of left and right wheels and a braking force in the other.

2. Description of the Related Art

A yaw moment control apparatus for a vehicle is known which has left and right follower wheels connected by a transmission provided with a pair of hydraulic clutches and produces a yaw moment in a leftward turning direction by engaging one of the hydraulic clutches to decrease the speed of the left wheel and to increase the speed of the right wheel or, alternatively, produces a yaw moment in a rightward turning direction by engaging the other of the hydraulic clutches to decrease the speed of the right wheel and to increase the speed of the left wheel. In Japanese Patent Application Serial No. 8-324323, the present assignee has previously proposed another yaw moment control apparatus for a vehicle in which a left hydraulic pump connected to and rotated by a left wheel and a right hydraulic pump connected to and rotated by a right wheel are connected via a hydraulic circuit, and either one of a driving force and a braking force is produced by the left hydraulic pump and the other by the right hydraulic pump, thereby controlling a yaw moment.

However, it is also possible to control the yaw moment of a vehicle by varying cornering forces of wheels, instead of by controlling the distribution of a driving force and a braking force between a left wheel and a right wheel.

The present invention has been made in view of the above-described problem, and the object of the present invention is to make further improvements to the art disclosed in Japanese Patent Application No. 8-324323 so that the control of a yaw moment of a vehicle can be more accurate by varying cornering forces of wheels.

SUMMARY OF THE INVENTION

To achieve the above object, the present invention provides a yaw moment control apparatus for a vehicle which comprises a left hydraulic pump connected to and rotated by a left wheel, a right hydraulic pump connected to and rotated by a right wheel, a first oil passage which connects a discharge port of the left hydraulic pump and a suction port of the right hydraulic pump, a second hydraulic passage which connects a discharge port of the right hydraulic pump and a suction port of the left hydraulic pump, a first variable throttle valve provided between the first oil passage and a tank, a second variable throttle valve provided between the second oil passage and the tank, first displacement control means for increasing a discharge displacement of the left hydraulic pump according to a closure of the first variable throttle valve, and second displacement control means for increasing a discharge displacement of the right hydraulic pump according to a closure of the second variable throttle valve, where the yaw moment control apparatus comprises a roll angle control means for rolling a vehicle body in one of leftward and rightward directions by using a hydraulic pressure produced by the left hydraulic pump during the closure of the first variable throttle valve, and in the other of the leftward and rightward directions by using a hydraulic pressure produced by the right hydraulic pump during the closure of the second variable throttle valve.

According to the above-described construction, if both the first variable throttle valve and the second variable throttle valve are opened, the first oil passage and the second oil passage are connected to the tank and the left hydraulic pump and the right hydraulic pump are both brought into no-load states so that a driving force or a braking force is not produced in the left and right wheels. If the first variable throttle valve is throttled, a hydraulic pressure is produced in the first oil passage and the discharge displacement of the left hydraulic pump is increased by the first displacement control means so that the left hydraulic pump is brought into a pump state having a load and a braking force is produced in the left wheel, while the right hydraulic pump is brought into a motor state in which it is driven by an oil discharged by the left hydraulic pump, and a driving force is produced in the right wheel. Accordingly, a yaw moment in the leftward turning direction is produced, whereby if the vehicle is turning leftward, an under-steering tendency can be canceled, whereas if the vehicle is turning rightward, an over-steering tendency can be canceled.

If the second variable throttle valve is throttled, a hydraulic pressure is produced in the second oil passage and the discharge displacement of the right hydraulic pump is increased by the second displacement control means so that the right hydraulic pump is brought into a pump state having a load and a braking force is produced in the right wheel, while the left hydraulic pump is brought into a motor state in which it is driven by an oil discharged by the right hydraulic pump, and a driving force is produced in the left wheel. Accordingly, a yaw moment in the rightward turning direction is produced, whereby if the vehicle is turning leftward, an over-steering tendency can be canceled, whereas if the vehicle is turning rightward, an under-steering tendency can be canceled.

During turning, if the vehicle is caused to roll inward in the turning direction by the roll angle control means, the roll rigidity of the vehicle increases and the cornering forces of wheels greatly decreases. If the wheels are rear wheels, the under-steering tendency can be canceled, whereas if the wheels are front wheels, the over-steering tendency can be canceled. During turning, if the vehicle is made to roll outward in the turning direction by the roll angle control means, the roll rigidity of the vehicle decreases and the cornering forces of wheels slightly decreases. If the wheels are rear wheels, the over-steering tendency can be canceled, whereas if the wheels are front wheels, the under-steering tendency can be canceled.

The roll angle control means further include a left hydraulic cylinder for moving the left wheel up or down with respect to the vehicle body and a right hydraulic cylinder for moving the right wheel up or down with respect to the vehicle body.

According to the above construction, it is possible to accurately control the roll angle of the vehicle by means of a simple structure.

The roll angle control means may further include a stabilizer bar for connecting the left wheel and the right wheel, and a hydraulic cylinder for twisting the stabilizer bar.

According to the above construction, it is possible to accurately control the roll angle of the vehicle by means of a simple structure.

DETAILED DESCRIPTION OF THE PREFERRED EMBODIMENTS

The present invention will now be described by way of embodiments shown in the accompanying drawings.

Figure 1:
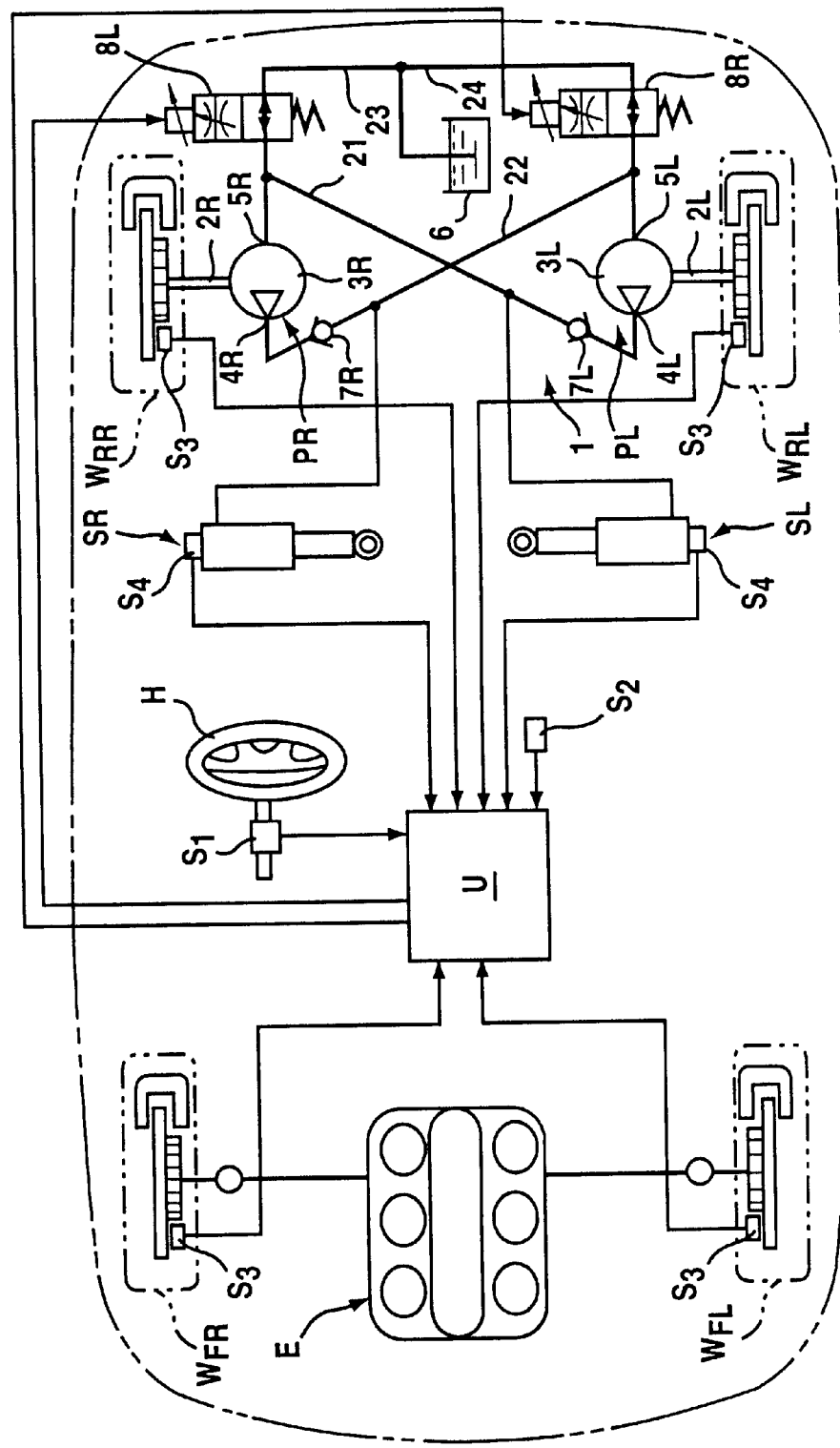
FIG. 1 is a schematic view of the entire construction of a vehicle provided with a yaw moment control apparatus.

In a preferred embodiment of the present invention, as shown in FIG. 1, a front engine and front drive vehicle is provided with left and right front wheels $W_{FL}$, $W_{FR}$, which are driven wheels driven by an engine E mounted in a front portion of a vehicle body, and left and right rear wheels $W_{RL}$, $W_{RR}$, which are follower wheels which rotate with the traveling of the vehicle and whose rotation speeds are controlled by a yaw moment control apparatus 1.

The yaw moment control apparatus 1 includes a left pump unit PL having a left hydraulic pump 3L directly coupled to and driven by an axle 2L of the left rear wheel $W_{RL}$, a right pump unit PR having a right hydraulic pump 3R directly coupled to and driven by an axle 2R of the right rear wheel $W_{RR}$, a left rear wheel suspension SL which suspends the left rear wheel $W_{RL}$, a right rear wheel suspension SR which supports the right rear wheel $W_{RR}$, a first oil passage 21 which connects a discharge port 4L of the left hydraulic pump 3L and a suction port 5R of the right hydraulic pump 3R, a second oil passage 22 which connects a discharge port 4R of the right hydraulic pump 3R and a suction port 5L of the left hydraulic pump 3L, a third oil passage 23 which connects the first oil passage 21 to a tank 6, a fourth oil passage 24 which connects the second oil passage 22 to the tank 6, a check valve 7L provided in the first oil passage 21 so as to allow oil to flow from the discharge port 4L of the left hydraulic pump 3L to the suction portion 5R of the right hydraulic pump 3R, a check valve 7R provided in the second oil passage 22 so as to allow oil to flow from the discharge port 4R of the right hydraulic pump 3R to the suction port 5L of the left hydraulic pump 3L, a first variable throttle valve 8L comprised of a solenoid valve provided in the third oil passage 23, and a second variable throttle valve 8R comprised of a solenoid valve provided in the fourth oil passage 24.

Connected to an electronic control unit U comprised of a microcomputer are a steering angle sensor $S_1$ which detects a steering angle on the basis of a rotating angle of a steering wheel H, a yaw rate sensor $S_2$ which detects a yaw rate of the vehicle body, four (4) wheel speed sensors $S_3$ which detect a vehicle speed on the basis of four wheel speeds, and stroke sensors $S_4$, $S_4$ which detect the strokes of the left and right rear wheel suspensions SL, SR.

Figure 2:
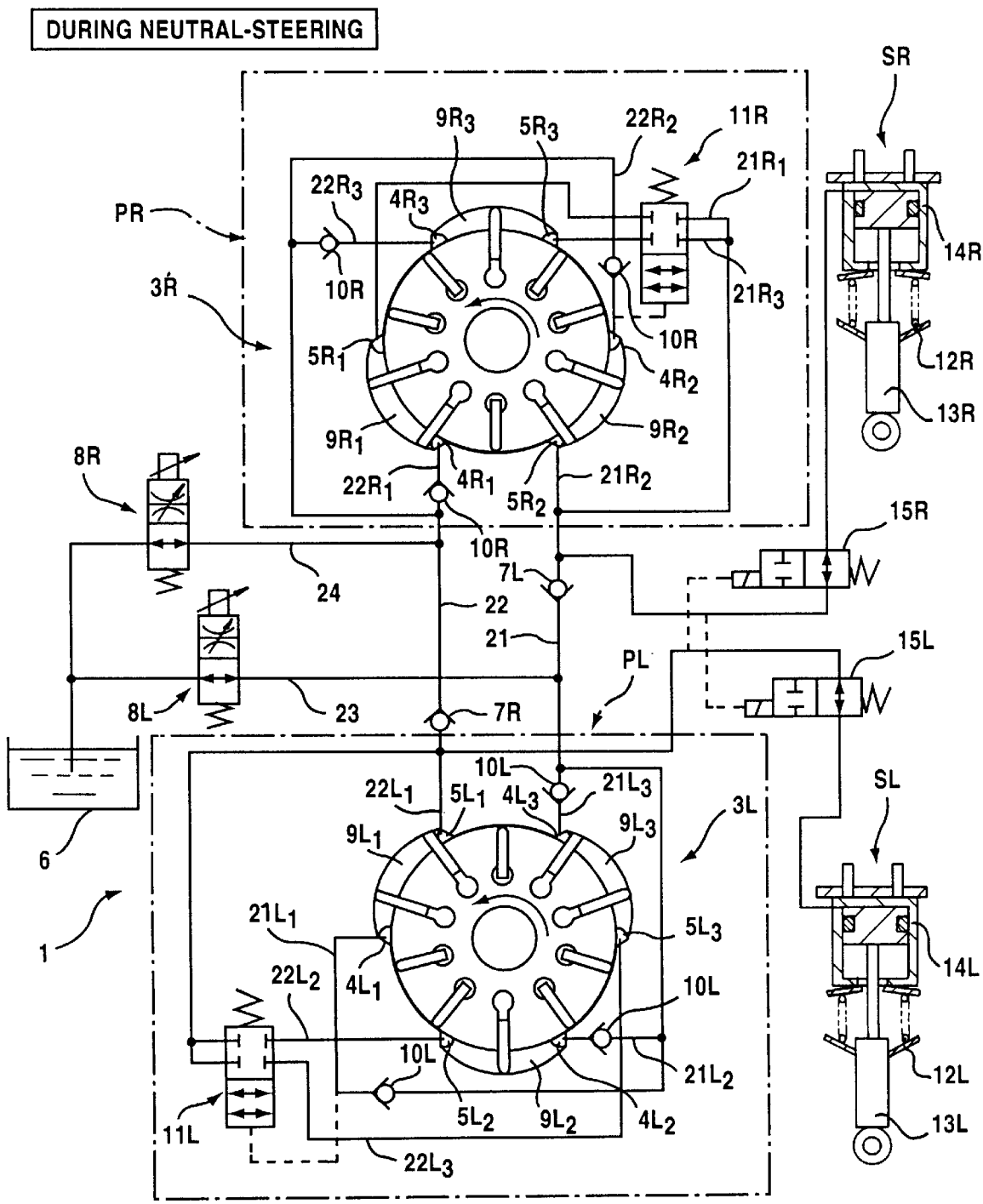
FIG. 2 is a hydraulic circuit diagram of the yaw moment control apparatus.

The detailed structures of the left and right pump units PL, PR will now be described with reference to FIG. 2.

The left hydraulic pump 3L of the left pump unit PL is provided with three operating chambers $9L_1$–$9L_3$ which are respectively provided with discharge ports $4L_1$–$4L_3$ and suction ports $5L_1$–$5L_3$. The right hydraulic pump 3R of the right pump unit PR is provided with three operating chambers $9R_1$–$9R_3$ which are respectively provided with discharge ports $4R_1$–$4R_3$ and suction ports $5R_1$–$5R_3$. The three discharge ports $4L_1$–$4L_3$ of the left hydraulic pump 3L are connected to the three suction ports $5R_1$–$5R_3$ of the right hydraulic pump 3R via the first oil passage 21 having the check valve 7L, and the discharge ports $4R_1$–$4R_3$ of the right hydraulic pump 3R are connected to the three suction ports $5L_1$–$5L_3$ of the left hydraulic pump 3L via the second oil passage 22 having the check valve 7R. An intermediate portion of the first oil passage 21 is connected to the tank 6 via the third oil passage 23 having the first variable throttle valve 8L, and an intermediate portion of the second oil passage 22 is connected to the tank 6 via the fourth oil passage 24 having the second variable throttle valve 8R.

A plurality of check valves 10L are respectively provided in three oil passages $21L_1$–$21L_3$ which branch off from an upstream side of the first oil passage 21 and lead to the three discharge ports $4L_1$–$4L_3$ of the left hydraulic pump 3L, and three oil passages $21R_1$–$21R_3$ which branch off from a downstream side of the first oil passage 21 communicate with the three suction ports $5R_1$–$5R_3$ of the right hydraulic pump 3R. A plurality of check valves 10R are respectively provided in three oil passages $22R_1$–$22R_3$ which branch off from an upstream side of the second oil passage 22 and lead to the three discharge ports $4R_1$–$4R_3$ of the right hydraulic pump 3R, and three oil passages $22L_1$–$22L_3$ which branch off from a downstream side of the second oil passage 22 communicate with the three suction ports $5L_1$–$5L_3$ of the left hydraulic pump 3L.

A first opening/closing valve 11L which is a first displacement control means comprised of a pilot valve operated by the hydraulic pressure of the oil passage $21L_1$ is provided in two oil passages $22L_2$, $22L_3$ which lead to suction ports $5L_2$, $5L_3$ of the two operating chambers $9L_2$, $9L_3$ of the left hydraulic pump 3L. A second opening/closing valve 11R which is a second displacement control means comprised of a pilot valve operated by the hydraulic pressure of the oil passage $22R_2$ is provided in the two oil passages $21R_1$, $21R_3$ which lead to the suction ports $5R_1$, $5R_3$ of the two operating chambers $9R_1$, $9R_3$ of the right hydraulic pump 3R.

The structures of the left and right rear wheel suspensions SL and SR will now be described with reference to FIG. 2.

The left and right rear wheel suspensions SL and SR include coil springs 12L, 12R; dampers 13L, 13R; and hydraulic cylinders 14L, 14R, respectively. The hydraulic cylinder 14L of the left rear wheel suspension SL is connected to the second oil passage 22 via a pilot valve 15L operated by the hydraulic pressure of the first oil passage 21, and the hydraulic cylinder 14R of the left rear wheel suspension SR is connected to the first oil passage 21 via a pilot valve 15R operated by the hydraulic pressure of the second oil passage 22. The pilot valves 15L, 15R are normally open valves, and when the first variable throttle valve 8L is closed and a hydraulic pressure is produced in the first oil passage 21, the pilot valve 15L is closed, whereas when the second variable throttle valve 8R is closed and a hydraulic pressure is produced in the second oil passage 22, the pilot valve 15R is closed.

The operation of the preferred exemplary embodiment having the above-described construction will now be described.

The electronic control unit U calculates a reference yaw rate on the basis of a steering angle detected by the steering angle sensor $S_1$ and a vehicle speed detected by the plurality of wheel speed sensors $S_3$ and compares this reference yaw rate with a real yaw rate detected by the yaw rate sensor $S_2$. If the real yaw rate coincides with the reference yaw rate, the electronic control unit U determines that the vehicle is in neutral-steering, and holds the first variable throttle valve 8L and the second variable throttle valve 8R in their opened states, as shown in FIG. 2.

When the first variable throttle valve 8L and the second variable throttle valve 8R are in the opened states, the first oil passage 21 and the second oil passage 22 communicate with the tank 6 via the third oil passage 23 and the fourth oil passage 24, respectively, and therefore the pressure of each of the first oil passage 21 and the second oil passage 22 is atmospheric. At this time, both the first and second opening/closing valves 11L and 11R are in their closed states, and the two operating chambers $9L_2$, $9L_3$ of the left hydraulic pump 3L stop their operations because the suction ports $5L_2$, $5L_3$ are closed, while the operating chambers $9R_1$, $9R_3$ of the right hydraulic pump 3R stop their operations because the suction ports $5R_1$, $5R_3$ are closed.

Therefore, the left hydraulic pump 3L supplies oil in the second oil passage 22 to the first oil passage 21 via an oil passage $22L_1$, the suction port $5L_1$, the operating chamber $9L_1$, the discharge port $4L_1$ and the oil passage $21L_1$. The right hydraulic pump 3R supplies oil in the first oil passage 21 to the second oil passage 22 via an oil passage $21R_2$, the suction port $5R_2$, the operating chamber $9R_2$, the discharge port $4R_2$ and the oil passage $22R_2$. At this time, the first oil passage 21 and the second oil passage 22 are at atmospheric pressure because the first variable throttle valve 8L and the second variable throttle valve 8R are opened, and therefore the left hydraulic pump 3L and the right hydraulic pump 3R are respectively rotated in their no-load states by the left rear wheel $W_{RL}$ and the right rear wheel $W_{RR}$ and do not produce a driving force or a braking force.

At this time, because a hydraulic pressure is not produced in the first oil passage 21 nor the second oil passage 22, neither of the left and right hydraulic cylinders 14L and 14R operates and the roll rigidity of the vehicle does not vary, either.

Figure 3:
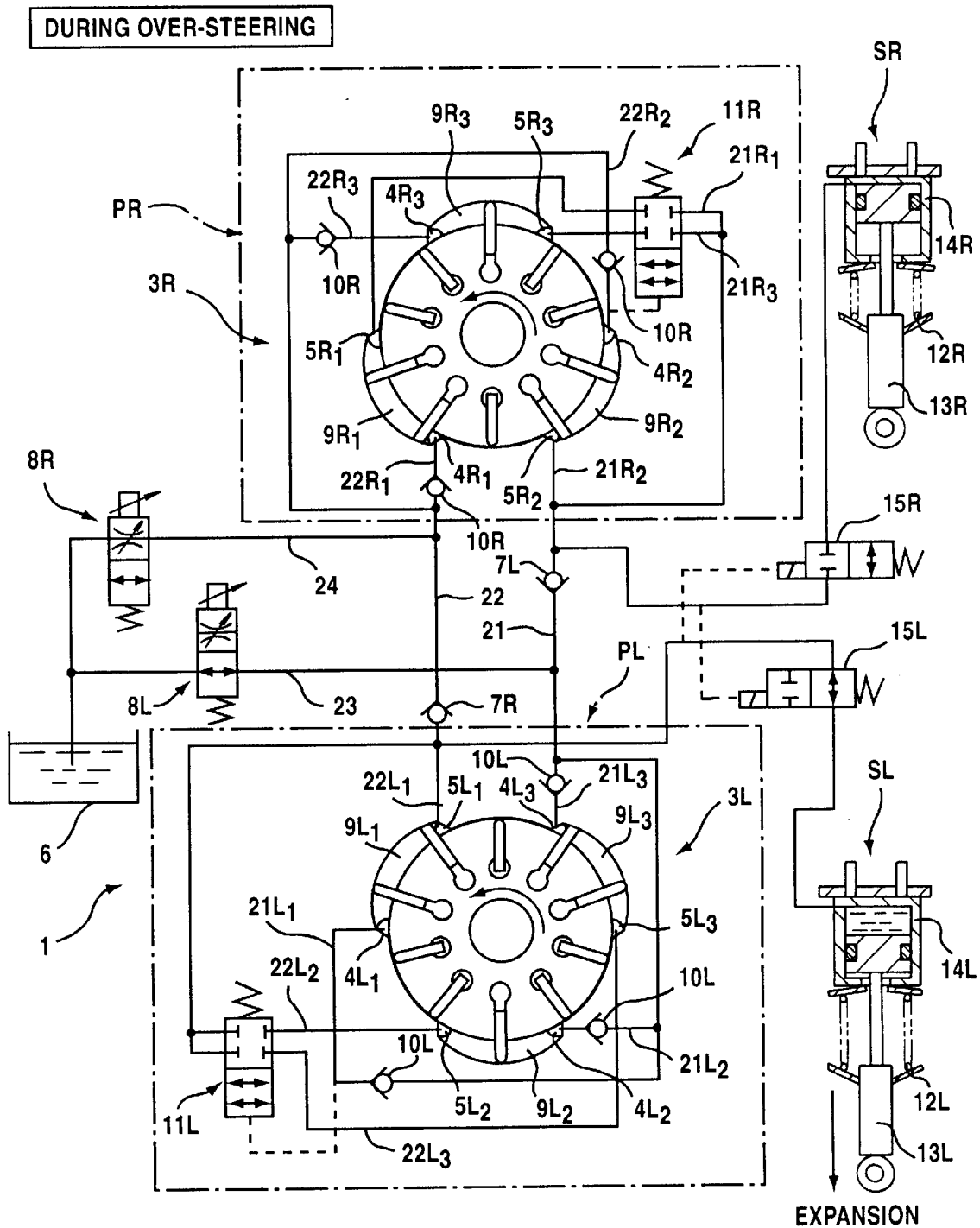
FIG. 3 is a view illustrating an operation during oversteering.

If the real yaw rate is greater than the reference yaw rate, the electronic control unit U determines that the vehicle has an over-steering tendency. For example, if the vehicle is turning leftward, the electronic control unit U throttles, according to the extent of the over-steering tendency, the second variable throttle valve 8R which connects the second oil passage 22 and the tank 6, thereby producing a flow passage resistance in the fourth oil passage 24, as shown in FIG. 3. Accordingly, the pressure of the second oil passage 22 increases, and the second opening/closing valve 11R is opened by the pressure of the oil passage $22R_2$ upstream of the second oil passage 22 and all the operating chambers $9R_1$–$9R_3$ of the right hydraulic pump 3R are brought into operative states. On the other hand, because the first variable throttle valve 8L is in the opened state and the first oil passage 21 is held at atmospheric pressure, the first opening/closing valve 11L is brought into a closed state and only the operating chamber $9L_1$ of the left hydraulic pump 3L is brought into an operative state.

Thus, in the right hydraulic pump 3R connected to a turning outside wheel of the vehicle which is turning leftward, a load occurs due to a pressure increase in the second oil passage 22 which is a discharge oil passage of the right hydraulic pump 3R, and the load causes a braking force to act on the turning outside wheel. In addition, an oil equivalent to the difference in discharge quantity between the right hydraulic pump 3R whose three operating chambers $9R_1$–$9R_3$ are in operation and the left hydraulic pump 3L whose operating chamber $9L_1$ alone is in operation is supplied to the operating chamber $9L_1$ of the left hydraulic pump 3L. The oil drives the left hydraulic pump 3L which serves as a motor, thereby producing a driving force in a turning inside wheel. In this manner, since the braking force is produced in the turning outside wheel and the driving force is produced in the turning inside wheel, a yaw moment which restrains the turning of the vehicle can act to cancel the over-steering tendency.

At the same time, the pilot valve 15R is closed by the pressure rise in the second oil passage 22 and the right hydraulic cylinder 14R is locked in a retracted position, and the left hydraulic cylinder 14R is driven and expanded by an oil supplied from the second oil passage 22 through the pilot valve 15L which is in an opened state, whereby the vehicle rolls rightward. Accordingly, the roll rigidity of the vehicle is brought into a substantially decreased state.

Figure 6:
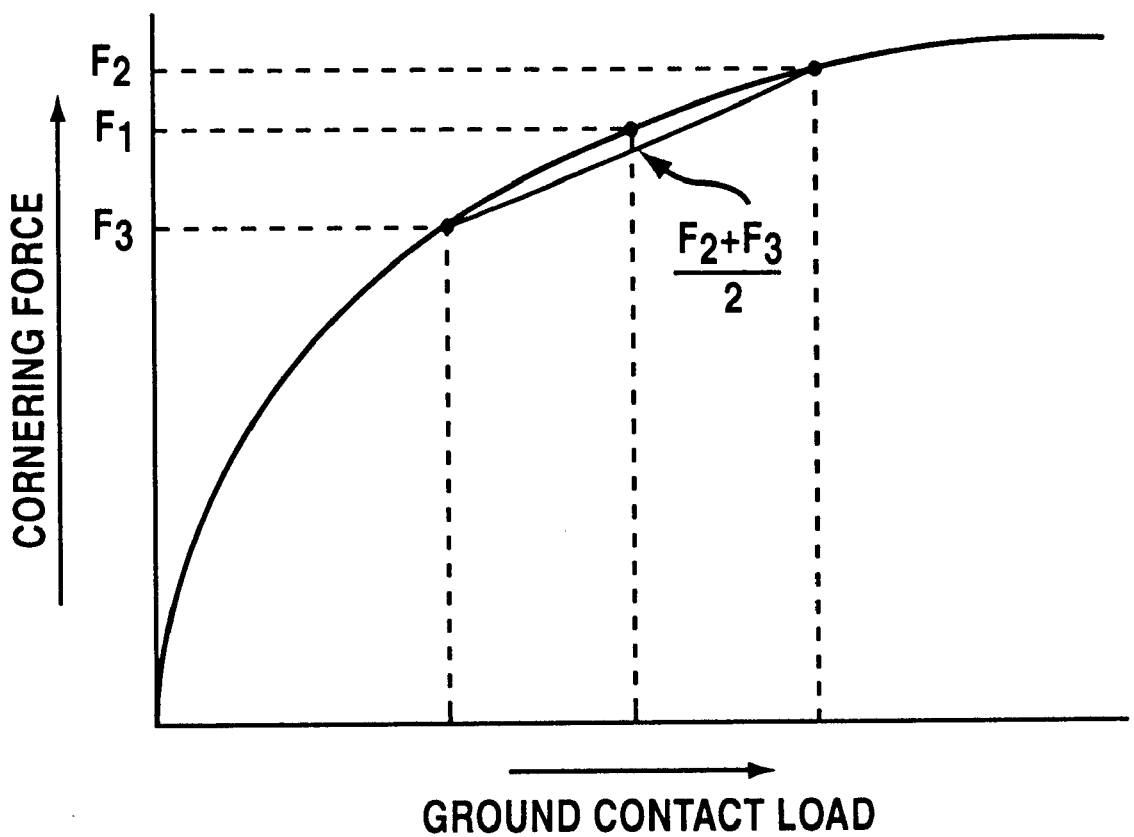
FIG. 6 is a graph showing a relation between ground contact loads and cornering forces of tires.

FIG. 6 shows a characteristic curve of a variation in cornering force with respect to a variation in the ground contact loads of tires. If the ground contact loads of left and right tires are equal, the sum of the cornering forces of both tires is $2F_1$. If the vehicle turns, the ground contact load of a tire which is located outside in the turning direction increases to $F_2$ from the aforesaid $F_1$, whereas the ground contact load of a tire which is located inside in the turning direction decreases to $F_3$ from the aforesaid $F_1$, by the effect of a centrifugal force which acts on the vehicle body outward in the turning direction. At this time, since the characteristic curve is upward convex, $F_2+F_3<2F_1$, so that the sum of the cornering forces of both tires decreases from $2F_1$ to $F_2+F_3$ as the result of the turning.

In a vehicle which has high roll rigidity, i.e., a vehicle whose vehicle body does not easily incline outward in the turning direction when a centrifugal force acts on the vehicle body, the centrifugal force is directly transmitted to the left and right tires, and therefore the ground contact loads of the left and right tires vary greatly and the sum of the cornering forces greatly decreases. On the other hand, in a vehicle which has low roll rigidity, i.e., a vehicle whose vehicle body easily inclines outward in the turning direction when a centrifugal force acts on the vehicle body, the centrifugal force is not easily transmitted to the left and right tires, and therefore variations in the ground contact loads of the left and right tires become small and the sum of the cornering forces substantially does not decrease.

Thus, if the roll rigidity of the vehicle is brought into the substantially decreased state as described above, a decrease in the sum of the cornering forces of the left and right rear wheels $W_{RL}$ and $W_{RR}$ becomes small, whereby the over-steering tendency can be canceled. In this manner, not only are the driving force and the braking force produced in the turning inside wheel and the turning outside wheel of the left and right rear wheels $W_{RL}$ and $W_{RR}$, respectively, but also a decrease due to turning in the sum of the cornering forces of the left and right rear wheels $W_{RL}$ and $W_{RR}$ is made small, whereby the over-steering tendency can be canceled far more effectively.

Figure 4:
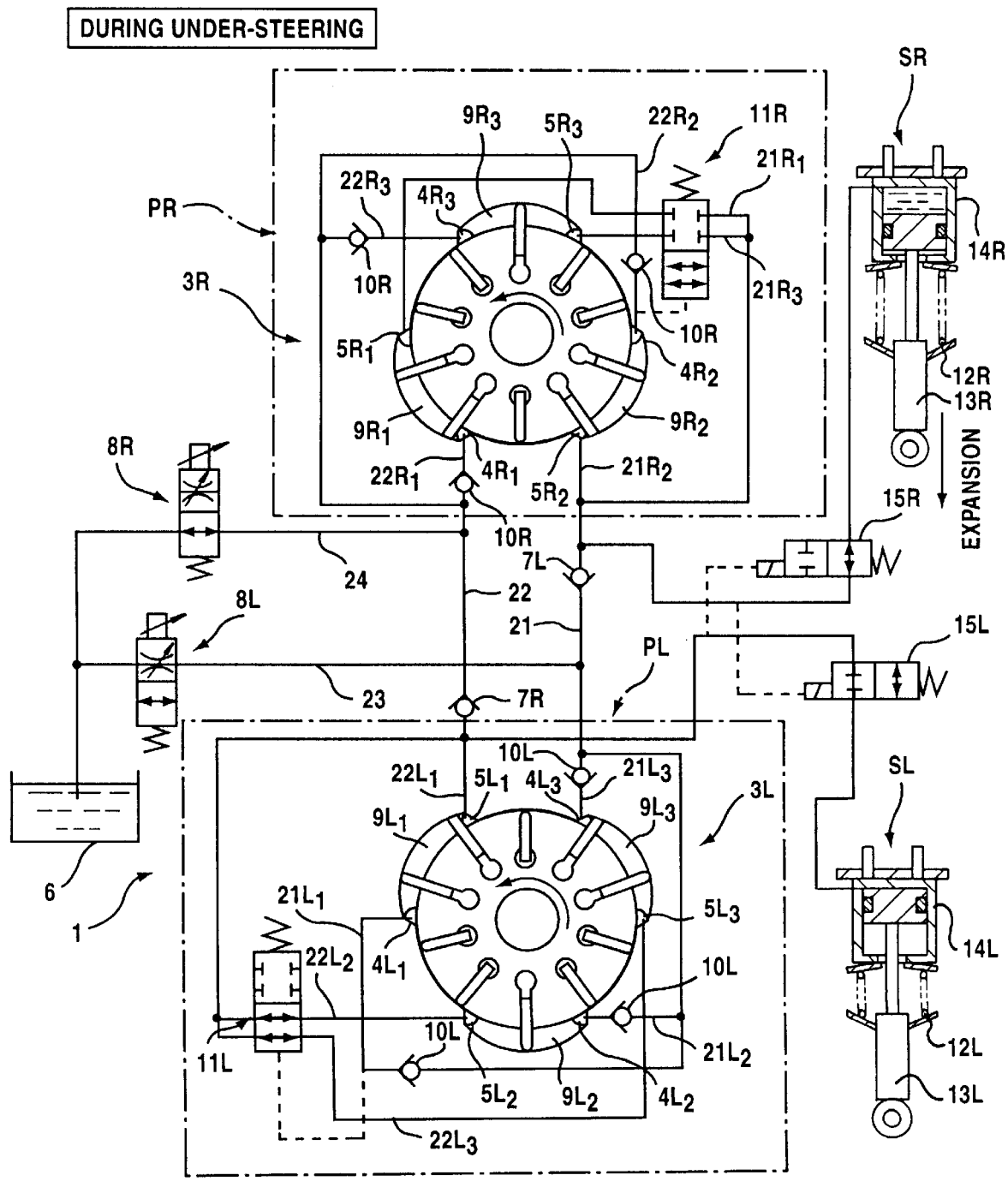
FIG. 4 is a view illustrating an operation during understeering.

If the real yaw rate is less than the reference yaw rate, the electronic control unit U determines that the vehicle has an under-steering tendency. For example, if the vehicle is turning leftward, the electronic control unit U throttles, according to the extent of the under-steering tendency, the first variable throttle valve 8L which connects the first oil passage 21 and the tank 6, thereby producing a flow passage resistance in the third oil passage 23, as shown in FIG. 4. Accordingly, the pressure of the first oil passage 21 increases, and the first opening/closing valve 11L is opened by the pressure of the oil passage 21L$_1$ upstream of the first oil passage 21 and all the operating chambers 9L$_1$–9L$_3$ of the left hydraulic pump 3L are brought into operative states. On the other hand, because the second variable throttle valve 8R is in the opened state and the second oil passage 22 is held at atmospheric pressure, the second opening/closing valve 11R is brought into a closed state and only the operating chamber 9R$_2$ of the right hydraulic pump 3R is brought into an operative state.

Thus, in the left hydraulic pump 3L connected to the turning inside wheel of the vehicle which is turning leftward, a load occurs due to a pressure increase in the first oil passage 21 which is a discharge oil passage of the left hydraulic pump 3L, and the load causes a braking force to act on the turning inside wheel. In addition, an amount of oil equivalent to the difference in discharge quantity between the left hydraulic pump 3L whose three operating chambers 9L$_1$–9L$_3$ are in operation and the right hydraulic pump 3R whose operating chamber 9R$_2$ alone is in operation is supplied to the operating chamber 9R$_2$ of the right hydraulic pump 3R. The oil drives the right hydraulic pump 3R which serves as a motor, thereby producing a driving force in the turning outside wheel. In this manner, since the braking force is produced in the turning inside wheel and the driving force is produced in the turning outside wheel, a yaw moment which assists in the turning of the vehicle can act to cancel the under-steering tendency.

At the same time, the pilot valve 15L is closed by the pressure rise in the first oil passage 21 and the left hydraulic cylinder 14L is locked in a retracted position, and the right hydraulic cylinder 14L is driven and expanded by an oil supplied from the first oil passage 21 through the pilot valve 15R which is in an opened state, whereby the vehicle rolls leftward. Accordingly, the roll rigidity of the vehicle is brought into a substantially increased state.

Thus, if the roll rigidity of the vehicle is brought into the substantially decreased state as described above, the sum of the cornering forces of the left and right rear wheels W$_{RL}$ and W$_{RR}$ greatly decreases, whereby the under-steering tendency can be canceled. In this manner, not only are the braking force and the driving force produced in the turning inside wheel and the turning outside wheel of the left and right rear wheels W$_{RL}$ and W$_{RR}$, respectively, but also the sum of the cornering forces of the left and right rear wheels W$_{RL}$ and W$_{RR}$ during turning is greatly decreased, whereby the under-steering tendency can be canceled far more effectively.

Figure 5:
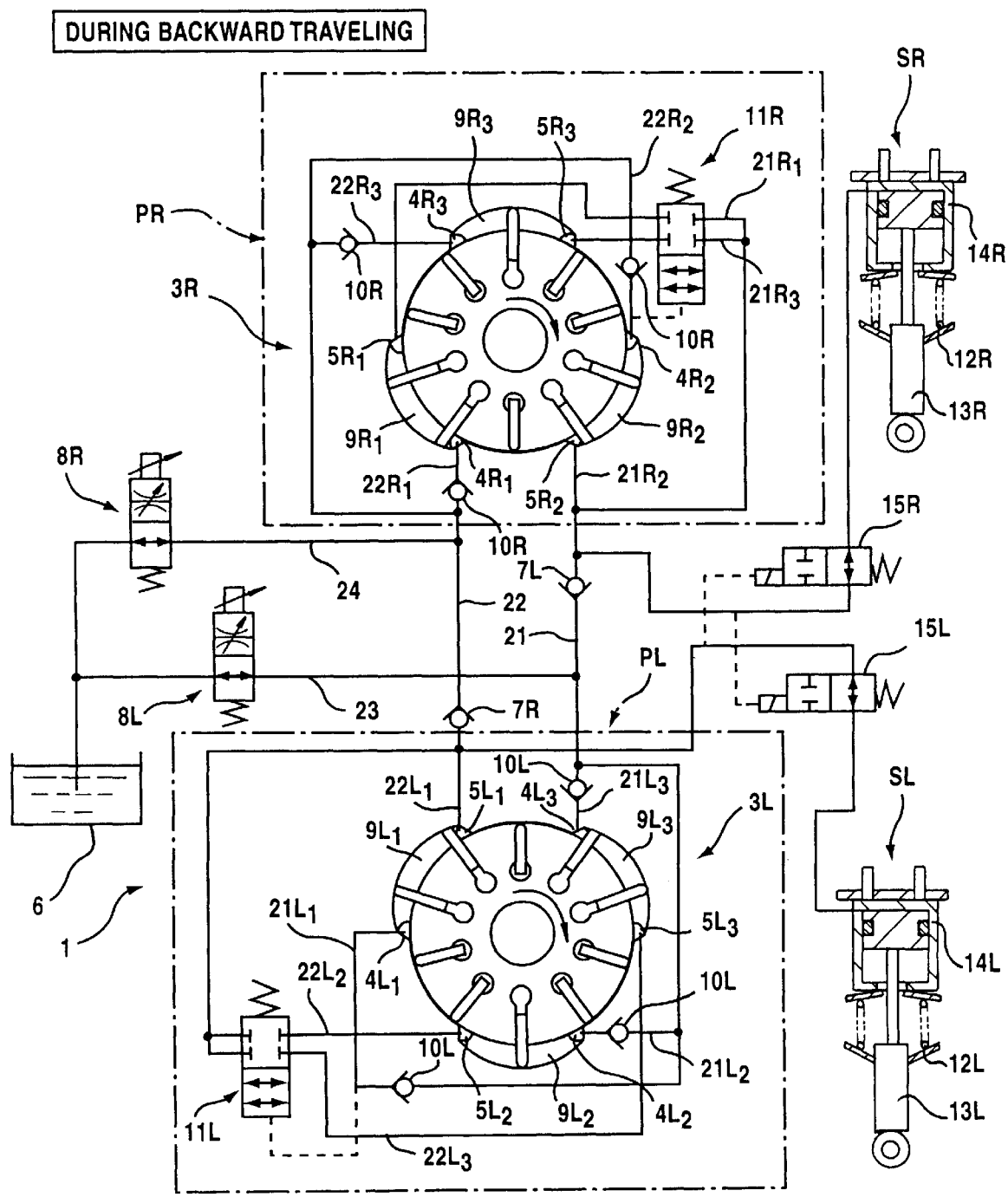
FIG. 5 is a view illustrating an operation during a backward traveling.

Furthermore, if the vehicle runs rearward, the rotating directions of both motors 3L and 3R are reversed, as shown in FIG. 5, and the oil sucked into the discharge ports 4L$_1$–4L$_3$; 4R$_1$–4R is discharged from the suction ports 5L$_1$–5L$_3$; 5R$_1$–5R$_3$. However, the suction of the oil is inhibited by the plurality of check valves 10L which are provided in the oil passages 22L$_1$–22L$_3$ which lead to the three discharge ports 4L$_1$–4L$_3$ of the left hydraulic pump 3L, and the vanes of the left hydraulic pump 3L move back in the radially inward direction and the left hydraulic pump 3L is brought into a no-load state. Similarly, the suction of the oil is inhibited by the plurality of check valves 10R which are provided in the oil passages 22R$_1$–22R$_3$ which lead to the discharge ports 4R$_1$–4R$_3$ of the right hydraulic pump 3R, and the vanes of the right hydraulic pump 3R move back in the radially inward direction and the right hydraulic pump 3R is brought into a no-load state. In addition, the left and right hydraulic cylinders 14L and 14R are held in retracted states, and control of yaw moment is not performed during the reverse running of the vehicle.

A second embodiment of the present invention will now be described with reference to FIGS. 7 and 8.

The second embodiment differs from the first embodiment in the structures of the left and right rear wheel suspensions SL and SR. The left and right rear wheel suspensions SL and SR include a pair of coil springs 12L, 12R, a pair of dampers 13L, 13R, a hydraulic cylinder 17 fixed to the right damper 13R, and a stabilizer bar 16 connected at the left end to the left damper 13L and coupled at the right end to an output rod of the hydraulic cylinder 17. The hydraulic cylinder 17 is connected to the first oil passage 21 and the second oil passage 22 via a changeover valve 18 driven by the electronic control unit U. If the hydraulic cylinder 17 retracts, the stabilizer bar 16 is twisted, so that the set load of the stabilizer bar 16 varies.

Figure 7:
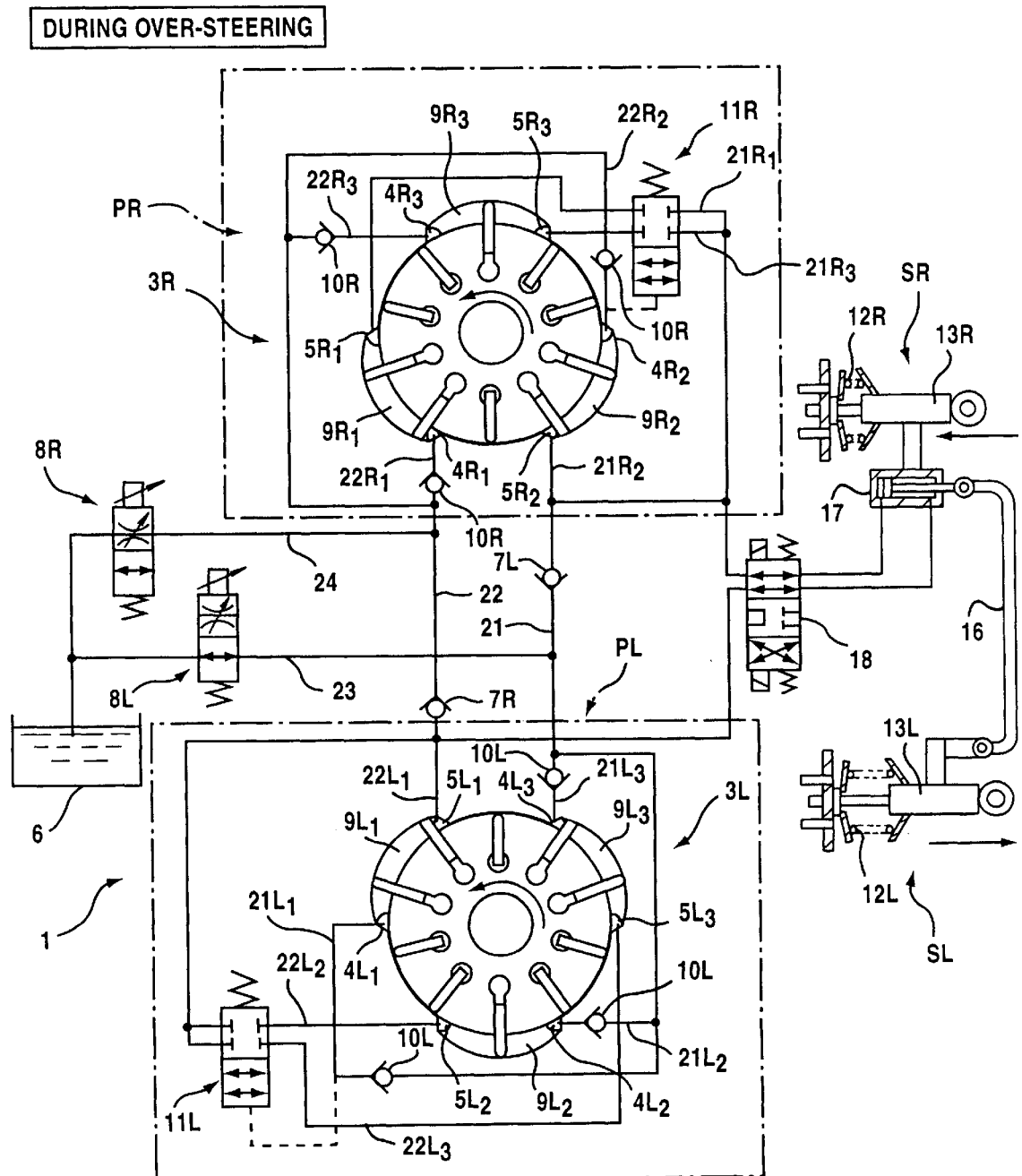
FIG. 7 is a view similar to FIG. 3, but showing a second embodiment of the present invention.

If the real yaw rate is greater than the reference yaw rate and the electronic control unit U determines that the vehicle has an over-steering tendency, the electronic control unit U closes the second variable throttle valve 8R as shown in FIG. 7, and a hydraulic pressure is produced in the second oil passage 22. This hydraulic pressure retracts the hydraulic cylinder 17 via the changeover valve 18 located in the shown position. Accordingly, the retraction of the right damper 13R and the expansion of the left damper 13L are promoted, and therefore the vehicle rolls greatly in a rightward direction which is outside in the turning direction and the roll rigidity of the vehicle is substantially decreased. Thus, similarly to the first embodiment, a decrease in the sum of the cornering forces of the left and right rear wheels W$_{RL}$ and W$_{RR}$ is made small, and the over-steering tendency can be effectively canceled in combination with the control of producing a driving force and a braking force in the turning inside wheel and the turning outside wheel of the left and right rear wheels W$_{RL}$ and W$_{RR}$.

Figure 8:
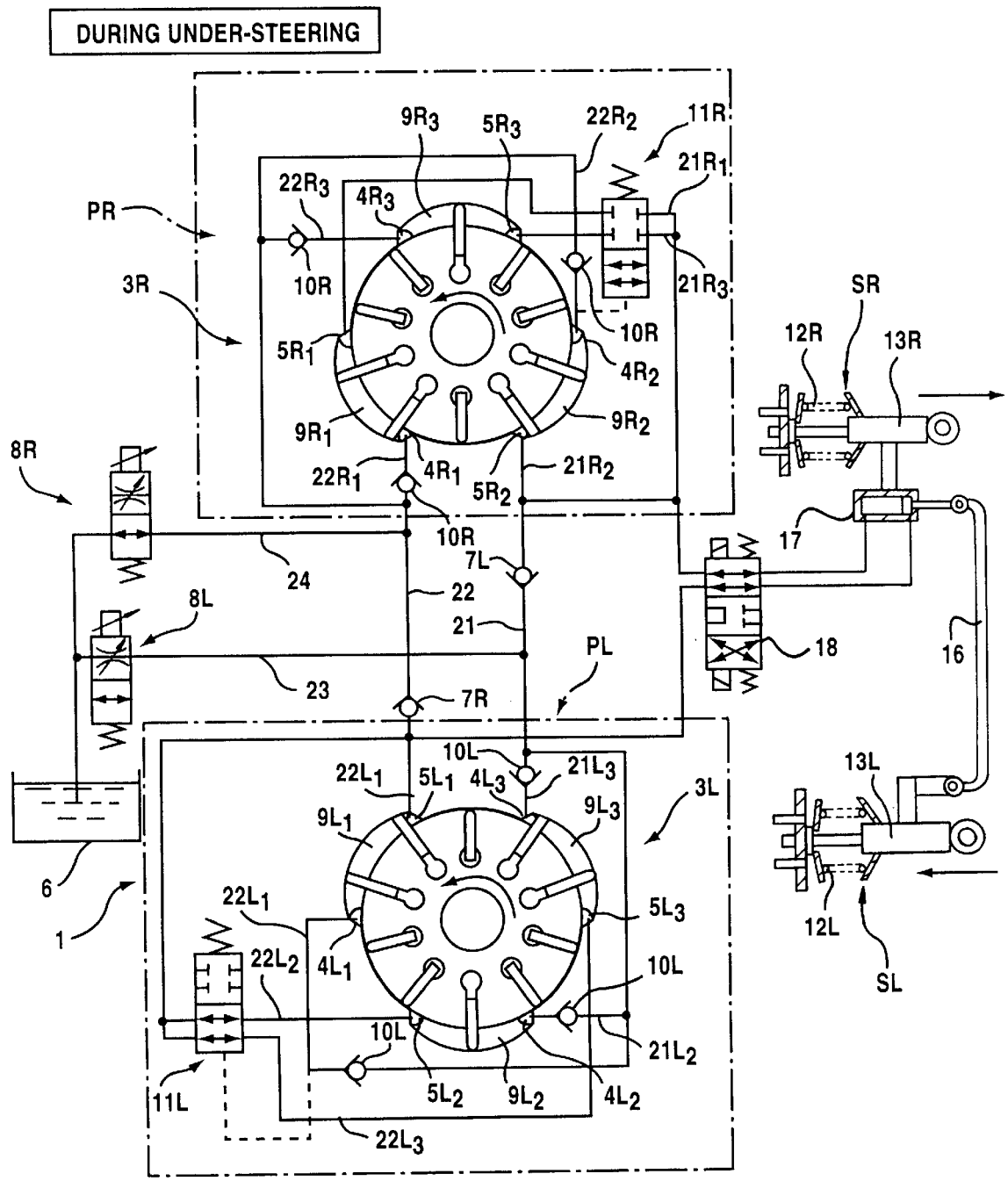
FIG. 8 is a view similar to FIG. 4, but showing the second embodiment of the present invention.

If the real yaw rate is less than the reference yaw rate and the electronic control unit U determines that the vehicle has an under-steering tendency, the electronic control unit U closes the first variable throttle valve 8L as shown in FIG. 8, and a hydraulic pressure is produced in the first oil passage 21. This hydraulic pressure expands the hydraulic cylinder 17 via the changeover valve 18 located in the position shown. Accordingly, the expansion of the right damper 13R and the retraction of the left damper 13L are inhibited, and therefore the vehicle rolls by a small amount in a leftward direction which is inside in the turning direction and the roll rigidity of the vehicle is substantially increased. Thus, similarly to the first embodiment, the sum of the cornering forces of the left and right rear wheels W$_{RL}$ and W$_{RR}$ greatly decreases, and the under-steering tendency can be effectively canceled in combination with the control of producing a driving force and a braking force in the turning inside wheel and the turning outside wheel of the left and right rear wheels W$_{RL}$ and W$_{RR}$.

It is to be noted that it is possible to precisely control the roll rigidity of the vehicle by changing over the changeover valve 18 from the shown upper position to a central position to lock the hydraulic cylinder 17 or to a lower position to drive the hydraulic cylinder 17 in an opposite direction.

Although the embodiments of the present invention have been described above in detail, the present invention is not limited to only the above-described embodiments and various design changes can be made.

For example, although in each of the embodiments the vehicle having the yaw moment control apparatus 1 for the left rear wheels $W_{RL}$ and $W_{RR}$ has been described by way of illustration, the present invention can also be applied to a vehicle having the yaw moment control apparatus 1 for the left and right front wheels $W_{FL}$, $W_{FR}$. In this case, it is necessary to decrease the cornering forces of the left and right front wheels $W_{FL}$, $W_{FR}$ during over-steering and to increase the cornering forces of the left and right front wheels $W_{FL}$, $W_{FR}$ during under-steering and it is, therefore, necessary to set the direction in which to roll the vehicle through roll angle control means to the opposite direction to that used in each of the embodiments. Specifically, during over-steering, the vehicle may be rolled inward in the turning direction to substantially increase the roll rigidity, whereas during under-steering, the vehicle may be rolled outward in the turning direction to substantially decrease the roll rigidity.

What is claimed is:

1. A yaw moment control apparatus for a vehicle comprising:

a left hydraulic pump connected to and rotated by a left wheel;

a right hydraulic pump connected to and rotated by a right wheel;

a first oil passage which connects a discharge port of said left hydraulic pump and a suction port of said right hydraulic pump;

a second oil passage which connects a discharge port of said right hydraulic pump and a suction port of said left hydraulic pump;

a first variable throttle valve provided between said first oil passage and a tank;

a second variable throttle valve provided between said second oil passage and said tank;

first displacement control means for increasing a discharge displacement of said left hydraulic pump according to a closure of said first variable throttle valve;

second displacement control means for increasing a discharge displacement of said right hydraulic pump according to a closure of said second variable throttle valve; and roll angle control means for rolling a vehicle body in one of leftward and rightward directions by using a hydraulic pressure produced by said left hydraulic pump during the closure of said first variable throttle valve, and in the other of the leftward and rightward directions by using a hydraulic pressure produced by said right hydraulic pump during the closure of said second variable throttle valve.

2. The yaw moment control apparatus as recited in claim 1, wherein said roll angle control means is provided with a left hydraulic cylinder for moving said left wheel up or down with respect to the vehicle body and a right hydraulic cylinder for moving said right wheel up or down with respect to the vehicle body.

3. The yaw moment control apparatus as recited in claim 1, wherein said roll angle control means is provided with a stabilizer bar for connecting said left wheel and said right wheel, and a hydraulic cylinder for twisting said stabilizer bar.

4. The yaw moment control apparatus as recited in claim 1, wherein said left wheel and said right wheel are rear wheels of the vehicle.

5. The yaw moment control apparatus as recited in claim 2, wherein said left wheel and said right wheel are rear wheels of the vehicle.

6. The yaw moment control apparatus as recited in claim 3, wherein said left wheel and said right wheel are rear wheels of the vehicle.

7. The yaw moment control apparatus as recited in claim 1, wherein said left wheel and said right wheel are front wheels of the vehicle.

8. The yaw moment control apparatus as recited in claim 2, wherein said left wheel and said right wheel are front wheels of the vehicle.

9. The yaw moment control apparatus as recited in claim 3, wherein said left wheel and said right wheel are front wheels of the vehicle.

10. A method of effecting yaw moment control in a vehicle including a yaw rate sensor, a plurality of wheel speed sensors, a steering angle sensor, and left and right hydraulic pumps connected to and rotated by left and right wheels, respectively, comprising the step of:

detecting a real yaw rate from an output of the yaw rate sensor;

calculating a reference yaw rate based on a steering angle detected by the steering angle sensor and a vehicle speed detected by the plurality of wheel speed sensors;

comparing the reference yaw rate with the actual yaw rate, and, if the reference yaw rate and the actual yaw rate are not equal;

controlling oil pressures to the left and right hydraulic pumps respectively, to produce a driving force on one of the right and left wheels and a braking force on the other of the right and left wheels to tend to equalize the reference yaw rate and the actual yaw rate.

11. The method of effecting yaw moment control, as recited in claim 10, further including left and right hydraulic cylinders connected to the left and right wheels, respectively, comprising the additional step of:

controlling oil pressures to the left and right hydraulic cylinders to move the left and right wheels in opposite directions up or down with respect to a body of the vehicle, to cause the body to roll in a manner so as to tend to equalize the reference yaw rate and the actual yaw rate.

12. The method of effecting yaw moment control, as recited in claim 10, further including a stabilizer bar connecting the left and right wheels, and a hydraulic cylinder, corrected to the stabilizer bar, comprising the step of:

controlling oil pressure to the hydraulic cylinder to provide a torsional stress to the stabilizer bar to move the left and right wheels up or down in opposite directions with respect to the body of the vehicle to cause the body to roll in a manner so as to tend to equalize the reference yaw rate and the actual yaw rate.

* * * * *